(12) United States Patent
Lin

(10) Patent No.: US 7,751,913 B2
(45) Date of Patent: Jul. 6, 2010

(54) METHOD AND SYSTEM FOR REDUCING POWER CONSUMPTION OF A SOUND PROCESSOR

(75) Inventor: David H. Lin, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1468 days.

(21) Appl. No.: 11/048,305

(22) Filed: Jan. 31, 2005

(65) Prior Publication Data

US 2006/0173690 A1    Aug. 3, 2006

(51) Int. Cl.
*G06F 17/00*    (2006.01)
*H03G 3/00*    (2006.01)

(52) U.S. Cl. .............................. 700/94; 381/61; 381/62; 381/63; 381/104; 381/107

(58) Field of Classification Search ............. 381/61–63, 381/1, 18, 19; 711/100; 700/94; 718/100–102
See application file for complete search history.

(56) References Cited

U.S. PATENT DOCUMENTS 6,952,621 B1 * 10/2005 Malcolm et al. .............. 700/94

* cited by examiner

*Primary Examiner*—Devona E Faulk
(74) *Attorney, Agent, or Firm*—Cochran Freund & Young LLC

(57) ABSTRACT

The present invention provides a method and system for reducing power consumption of a sound processor. Aspects of the invention include providing a sound processor access to at least one register having a plurality of bits corresponding to sound operations capable of being performed by the sound processor; and allowing a host processor to write a value to at least a portion of the plurality of bits in the register during sound processing to selectively disable individual operations performed by the sound processor.

18 Claims, 4 Drawing Sheets

100

Global Enable Register 128

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | Number of 2D Voices | | | | | | Number of 3D Voices | | | | Enable bits | | | | | | | | | | | | | | | | | | |

FIG. 3

Voice Disable Register 138

138a

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | Voices 31-0 | | | | | | | | | | | | | | | | | |

138b

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | | | | | | | Voices 63-32 | | | | | | | | | | | | | | | | | |

FIG. 4

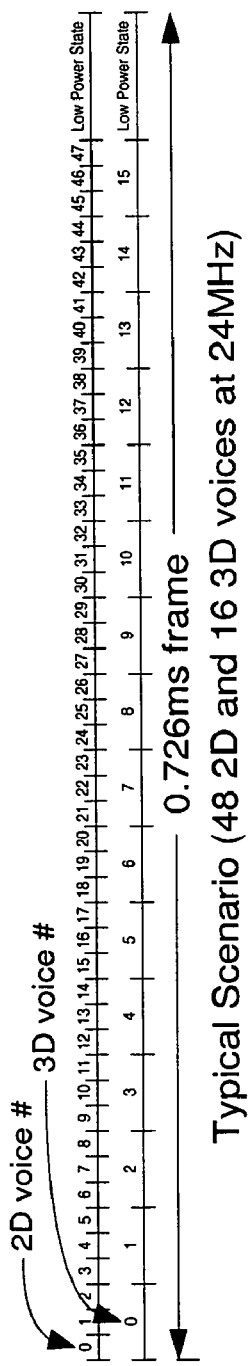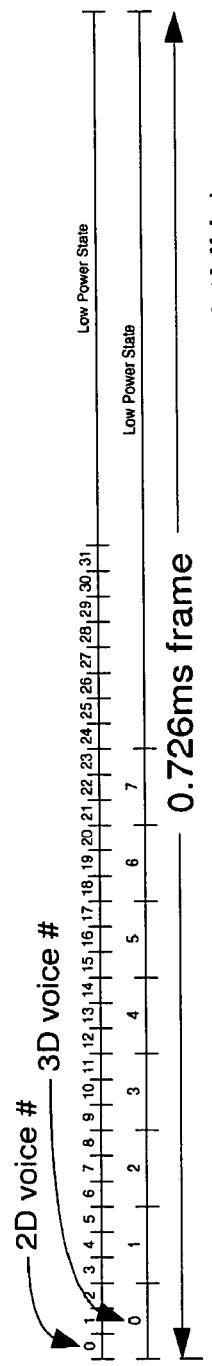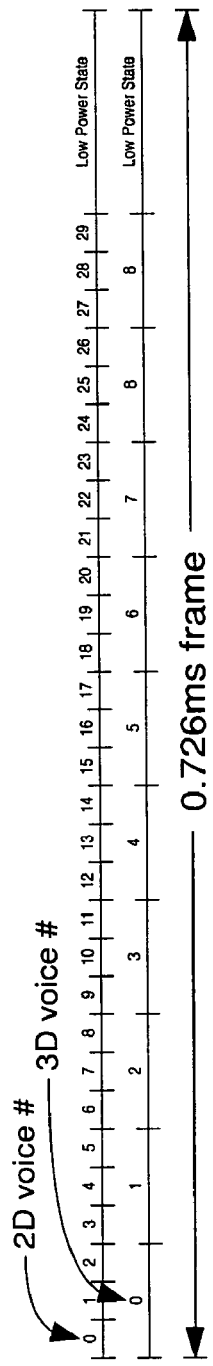
FIG. 5 Typical Scenario (48 2D and 16 3D voices at 24MHz)
FIG. 6 Low-Power Scenario 1 (32 2D and 8 3D voices at 24MHz)
FIG. 7 Low-Power Scenario 2 (30 2D and 10 3D voices at 16MHz)

METHOD AND SYSTEM FOR REDUCING POWER CONSUMPTION OF A SOUND PROCESSOR

FIELD OF THE INVENTION

The present invention relates to sound processors used in electronic devices, and more particularly to a method and system for reducing power consumption of a sound processor for use in hand-held devices.

BACKGROUND OF THE INVENTION

The use of hand-held electronic devices capable of simultaneously playing video and audio are proliferating. Examples of such devices include portable video gaming systems, portable DVD players, and cell phones. One commonality between hand-held electronic devices is the fact that they primarily run on batteries, therefore, conservation of energy is extremely important.

One important component of hand-held electronic devices is the output of sound. Digitally recorded sound must typically be input to and processed by a sound processor included within the electronic device. The sound is typically input as a series of frames, one for each voice in the system (e.g., 64), and each frame comprises some number of sound samples (e.g., 32). The sound processor typically processes each of the voices serially, although parallel processing is also done. In serial embodiments, the sound processor has a finite amount of time in which to process each voice. The sound processor uses each voice time slot to control how the voices in the input sound will be modified by certain operations in the during the data processing stage. Example of operation are effects that the sound processor may apply to the voices. Such effects commonly include gain envelopes, low frequency oscillator (or "LFO") incorporation (as gain or pitch), and pitch envelopes. Typically, the sound processor is connected to a host processor in the electronic device that executes a software program responsible for producing the video and/or sound, and it is the software program that instructs the sound processor effects to apply to the voices.

Due to the amount of possible operations that can be performed on each voice, the sound processor is one component in a hand-held electronic besides the video system that drains power. Conventional methods for reducing power consumption of components of handheld devices that require low power are to employ general techniques such as clock gating and operand isolation to the integrated circuits comprising the components. However, these techniques are implemented during the design of the device and permanently limit the capabilities of the components.

Accordingly, what is needed is an improved architectural power saving feature that reduces power consumption of a sound processor, but does not permanently limit the operations capable of being performed by the sound processor. The present invention addresses such a need.

BRIEF SUMMARY OF THE INVENTION

The present invention provides a method and system for reducing power consumption of a sound processor. Aspects of the invention include providing a sound processor access to at least one register having a plurality of bits corresponding to sound operations capable of being performed by the sound processor; and allowing a host processor to write a value to at least a portion of the plurality of bits in the register during sound processing to selectively disable individual operations performed by the sound processor.

According to the method and system disclosed herein, the registers of the present invention enable a developer of content played on a handheld device that includes a sound processor to write a program that dynamically limits the number of operations performed by the sound processor at any given time. This reduces the power consumed by the sound processor and conserves overall power for the host device without permanently limiting the number of sound processor operations.

BRIEF DESCRIPTION OF SEVERAL VIEWS OF THE DRAWINGS

FIG. 3 is a diagram illustrating the global enable register.

FIG. 4 is a diagram illustrating the voice disable register.

FIGS. 5-7 are timing diagrams showing the processing and a number of 2-D and 3-D voices during a time frame.

DETAILED DESCRIPTION OF THE INVENTION

The present invention relates to reducing power consumption of a sound processor. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides an architectural power saving feature for use in a sound processor that dynamically reduces the power consumption of the sound processor. According to the preferred embodiment, the sound processor is provided with one or more registers having a plurality of bits corresponding to sound operations capable of being performed by the sound processor. During sound processing, a host processor may write values to bits in the registers to selectively disable individual operations performed by the sound processor. Limiting the number of operation performed by the sound processor reduces the power consumed by the sound processor and therefore conserves overall power for the host device without permanently limiting the number of sound processor operations.

Figure 1:
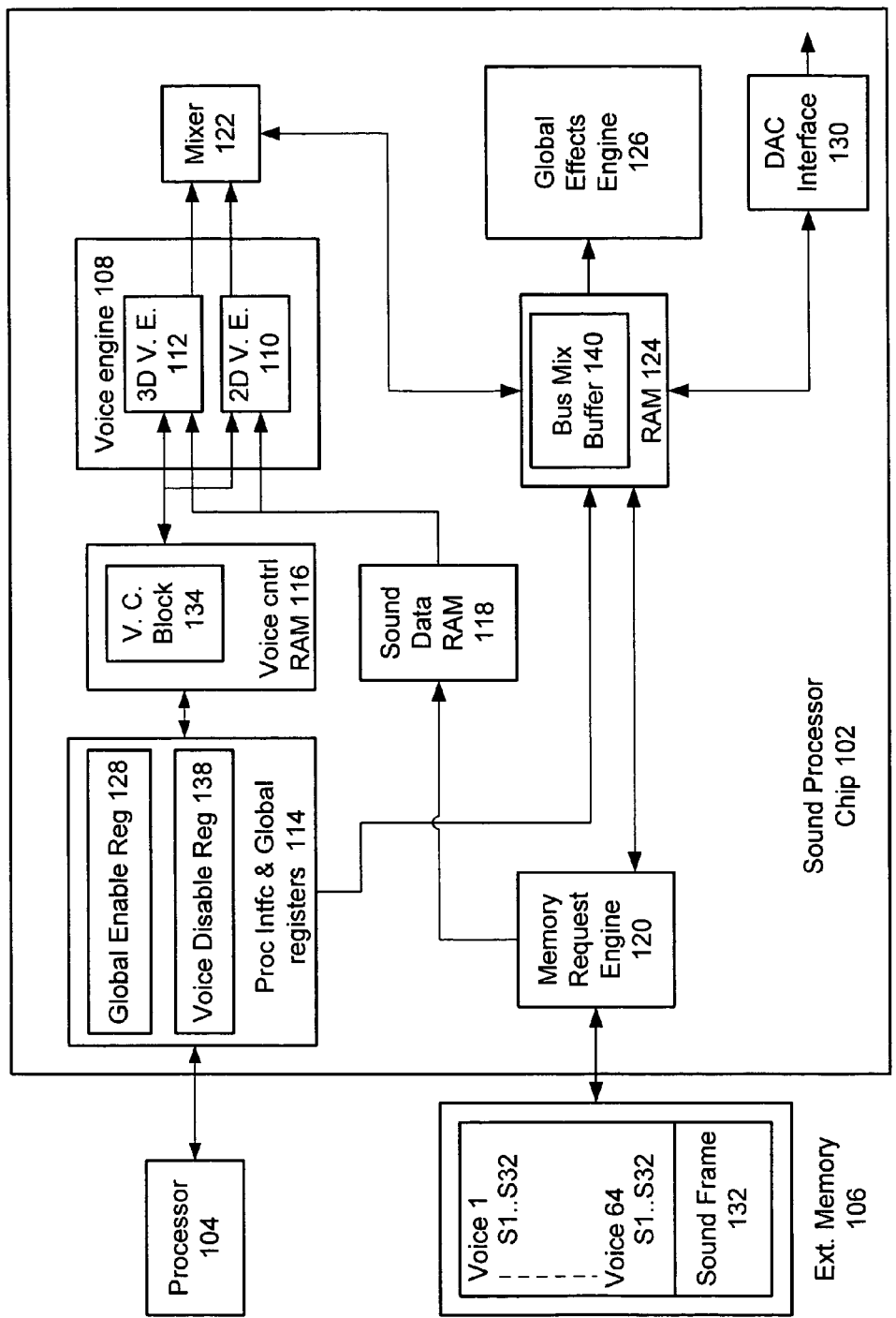
FIG. 1 is a diagram illustrating an exemplary sound processing architecture having power saving features in a sound in accordance with a preferred embodiment of the present invention.

FIG. 1 is a diagram illustrating an exemplary sound processing architecture having power saving features in accordance with a preferred embodiment of the present invention. The sound processing system 100 preferably includes a sound processor chip 102 that interacts with an external processor 104 and external memory 106 in a handheld device such as a game system portable DVD player, for instance. The sound processor chip 102 includes a voice engine 108, which optionally includes separate 2-D and 3-D voice engines 110 and 112, a processor interface and global registers 114, a voice control RAM 116, a sound data RAM 118, a memory request engine 120, a mixer 122, a global effects engine 126, a digital-to-analog converter (DAC) interface 130, and a RAM 124.

Sound is input to the sound processor chip 102 from the external memory 106 as a series of sound frames, one per processed voice in the system. Each sound frame is associated with a voice, 132 and comprises some number of samples (e.g., thirty-two). The voice engine 108 processes one frame for each of the sixty-four voices in the system one at a time. The voice control block 134 stored in the voice control RAM 116 stores the settings that specify how the voice engine 108 is to process each of the sixty-four voices. The voice engine 108 begins by reading the voice control block 134 and the global registers 114 to determine the location of the input sound and sends a request to the memory request engine 120 to fetch the thirty-two samples of the voice being processed. The thirty-two samples are then stored in the sound data RAM 118 and processed by the voice engine 108 according to the contents of the corresponding control block 134.

The settings stored in the voice control block 134 include effects settings such as left/right volumes, a gain envelope, and LFO. During processing of the sound, the contents of the control block 134 may be altered by a high-level program (not shown) running on the processor 104. The processor interface 114 accepts the commands from processor, which are first typically translated down to AHB bus protocol.

The voice engine 108 reads the values from the control block 134 and applies effect settings 136 to the voices based on the settings of the voice bussing flags and parameters 138, as described above. The resulting values are then sent to the mixer 122. In a preferred embodiment, the 2D Voice Engine 110 is capable of handling 48 2D voices at 24 MHz operation, and the 3D Voice Engine 112 is capable of processing 16 3D voices at 24 MHz operation. The 3D voices require about three times the amount of processing as the 2D voices.

After the voice engine 108 processes all the samples for a particular voice, the contents of the bus mix buffer 140 are input to the global effects engine 126 to produce the final sound data. The global effects engine 126 performs operations such as reverb, master volume, and cross-talk cancellation for 3D voices. Four global low-frequency oscillators and four pitch envelopes are also implemented in the global effects engine 126, and the processor 104 can select whether to use these effects for each voice as pitch and gain modifiers. The final sound data output by the global effects engine 126 is sent to the DAC interface 130, where it is sent to the speaker at a rate of 44.1 KHz.

Figure 2:
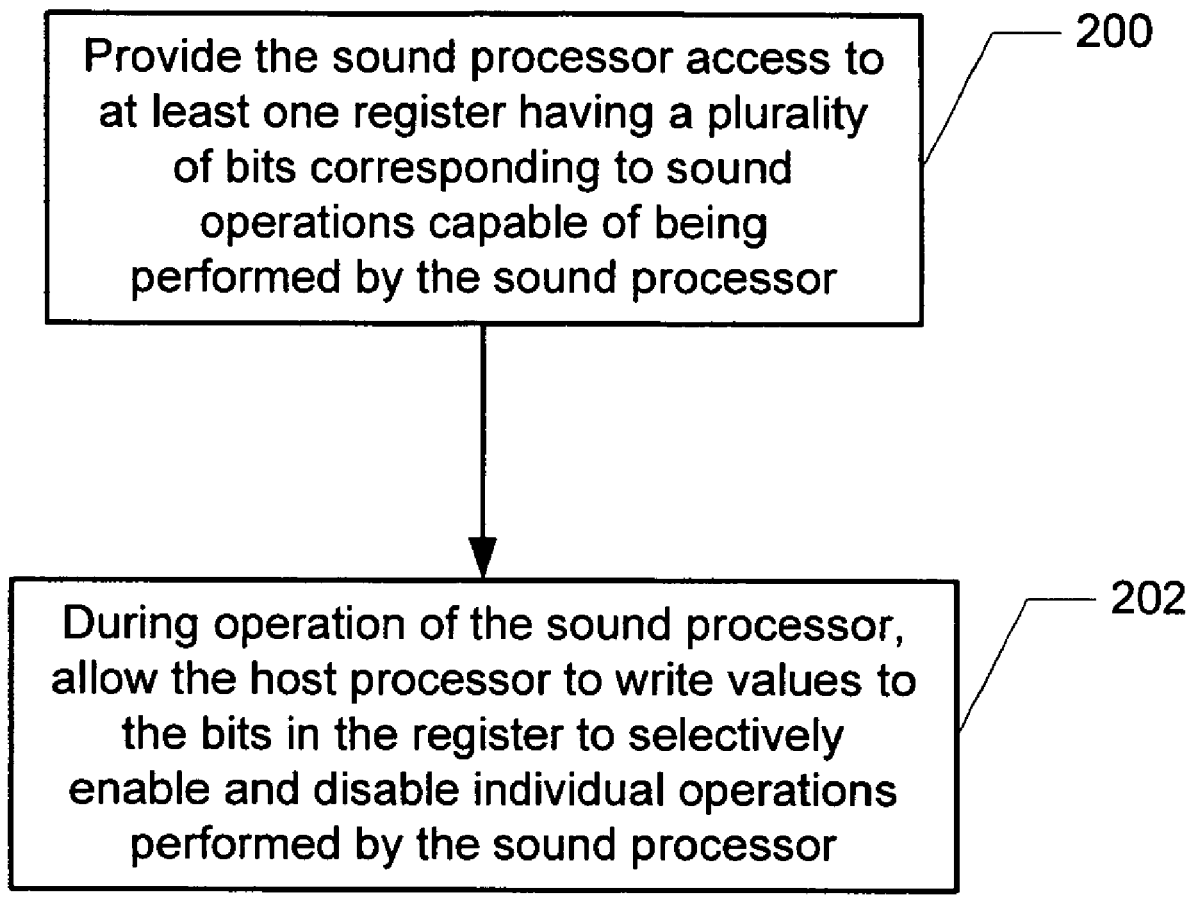
FIG. 2 is a flow diagram illustrating a process for dynamically reducing power consumption of a sound processor in accordance with the preferred embodiment of the present invention.

FIG. 2 is a flow diagram illustrating a process for dynamically reducing power consumption of a sound processor in accordance with the preferred embodiment of the present invention. The process begins in step 200 by providing the sound processor access to at least one register having a plurality of bits corresponding to sound operations capable of being performed by the sound processor. In one preferred embodiment, this is accomplished by providing at least one global enable register 128 and at least one voice disable register 138 in the processor interface and global registers 114 of the sound processor, as shown in FIG. 1.

FIG. 3 is a diagram illustrating the global enable register 128. In a preferred embodiment, the global enable register 128 includes 32-bits. In an exemplary embodiment, bits 0-16 are used to enable/disable particular effects, bits 17-21 indicate the number of 3-D voices and is used to limit the number of 3-D voices processed, and bits 22-27 indicate the number of 2-D voices, and is used to limit the number of 2-D voices processed.

FIG. 4 is a diagram illustrating the voice disable register 138. Each bit in the voice disable register 138 corresponds to a particular voice and is used for disabling or pausing voices. In a preferred embodiment, two 32-bit voice disable registers 138*a* and 138*b* are provided, which are collectively referred to as the voice disable register 138. The bits comprising voice disable register 138*a* correspond to voices 0-31, and the bits comprising voice disable register 138*b* correspond to voices 32-63. In a preferred embodiment, the initial state for these registers is to have all the bits set to "1". The value of the bits in the voice disable register 138 may be recognized only at the beginning of a frame.

Although the present invention is described in terms of at least two separate registers 128 and 138, one of ordinary skill in the art will readily recognize that instead of different buffers, the functionality of the global enable register 128 and the voice disable register 138, as described below, may be implemented as one register or any number of registers.

Referring again to FIG. 2, in step 202 during operation of the sound processor, the host processor is allowed to write values to at least a portion of the plurality of bits in the register to thereby selectively enable and disable individual operations performed by the sound processor. Thus, the present invention allows software developers to customize their programs according to whether the software will be run on a low power platform, such as on a hand-held device. If so, the software program may be configured to set the global enable register 128 bits and the voice disable register 138 bits accordingly to dynamically change the power consumption of the sound processor during operation of a hand-held device.

In a preferred embodiment, the use of the global enable register 128 and the voice disable register 138 allows program developers to reduce power consumption of the sound processor by enabling/disabling any combination of the following sound processor operations: 1) effects performed by the global effects engine 126, 2) the DAC interface 130, 3) 3-D voices in 2-D mode, 4) the number of 3-D and 2-D voices processed, and 5) which voices are to be processed. Thus, the present invention provides five power saving features that may be used to reduce power consumption of the sound processor. Power saving features 1) through 4) are preferably configured using the global enable register of 128, while power saving feature 5) is preferably configured using the voice disable registers 138.

The first and simplest level of power saving features is the ability to turn off individual effects being performed by the global effects engine 126. If the Enable bit corresponding to a feature is "0", then the global effects engine 126 will skip processing of that operation. Any combination of the following features can be disabled: cross-talk cancellation, reverb, master volume, low-frequency oscillators (LFO), and pitch envelopes. The cross-talk cancellation feature can be disabled if headphones are used instead of loudspeakers, or if no 3D voices are used. The reverb feature can be turned off if reverb is not desired to be used. The master volume feature can be disabled if the master volume does not need to be modified, for example to fade in or fade out the sound, and the sound will play at full volume. The Low-frequency oscillators (LFO) feature can be disabled if no voice is using the LFOs, in which case the LFOs do not need to be updated by the global effects engine 126. The pitch envelope feature can be disabled if no voice is using the pitch envelopes, in which case the pitch envelopes do not need to be updated by the global effects engine 126.

The second power-saving feature is disabling the DAC Interface module 130. Both voice engines 110 and 112 and the global effects engine 126 rely on a signal from the DAC Interface module 130 to indicate that a new 32-sample time slice is beginning. When the voice engines 110 and 112 and global effects engine 126 finish their processing, they normally enter a very low-power state and await this signal from the DAC Interface module 130. Therefore, if the DAC interface module 130 does not send this signal, the whole sound processor remains in a very low-power state. This feature is useful for when the user of the hand-held device wants the device to enter a sleep state in the middle of playback. For example, if the user is in the middle of a game, and desires to stop temporarily and continue at a later time, the game system may have the ability to enter a low-power sleep state. In this case, by disabling the DAC interface module 130, all voices and all global effects will stop, and maintain their state. When the DAC interface disable bit in the global effects register 128 is reset, the sound will continue playing from where it stopped.

The third power-saving feature is the ability to configure the 3D voices to act as 2D voices. The developer may want to use this mode when many 2D voices are desired, and fewer 3D voices are required. Since 3D voices use about 3 times the processing power of 2D voices, this results in a reduction in power.

The fourth power-saving feature is limiting the number of 2D and 3D voices processed by the sum process. The 2D voice engine 110 and 3d voice engine 112 each have a control register field which says how many voices are implemented in the system. When the voice corresponding to this number is reached for each voice processor, it will enter a low-power state until the next 32-sample time slice. The system can save power by specifying lower numbers for the implemented 2D and 3D voices. For example, if 48 2D voices and 16 3D voices are possible at 24 MHz, any number lower than those numbers would cause the voices engines to enter their low-power states earlier and conserve energy (for example 32 2D voices and 8 3D voices).

FIGS. 5-7 are timing diagrams showing the processing and a number of 2-D and 3-D voices during a time frame, where time is the horizontal axis. FIG. 5 shows a typical scenario for the sound processor in which 48 2-D voices (top row) and 16 3-D voices (middle row) are processed at 24 MHz during a 0.726 ms frame (bottom row). Near the end of the frame, after the 48th 2-D and the 16th 3-D voice are processed, the sound processor is shown entering the low-power state.

FIG. 6 shows a scenario for the sound processor in which the number of 2-D voices (top row) and 3-D voices (middle row) processed at 24 MHz are reduced to 32 and 8, respectively, during a 0.726 ms frame. After the 32nd 2-D and the 8th 3-D voice are processed, the sound processor enters the low-power state. Because less voices were processed, the sound processor is in the low-power state for a significantly longer period of time during the frame, the saving more power than a scenario shown in FIG. 5

The feature of limiting the number of 2-D and 3-D voices also allows the whole system to run at a lower clock speed, which saves power. For example, if the system were to run at 16 MHz, setting the number of 2D voices to 30 and the number of 3D voices to 10 would allow the sound processor to operate correctly at the lower clock speed, as shown in FIG. 7

FIG. 7 is a timing diagram showing that limiting the number of 2-D and 3-D voices to conserve power works even when the sound processor is set to operate at a lower frequency. In this example a number of 2-D voices (top row) and 3-D voices (middle row) processed at a lower speed of 16 MHz during a 0.726 ms frame (bottom row) are reduced to 30 and 10, respectively. Even though the operating frequency is reduced, by limiting the number of 2-D and 3-D voices, the processor remains in the low-power state for a longer period of time compared with the scenario shown in FIG. 5.

As stated above, power saving features 1) through 4) are implemented by configuring the bits in the global effects register 128. In a preferred embodiment, the bits in the global effects register 128 are used as follows:

bit 0—DAC Interface Enable. When this bit is not set, the DAC Interface module will not send data to the DAC. The DAC Interface will also not give the "start of frame" indication, so all of the processing engines will be in a low power mode while retaining their state. This bit acts as a type of global pause bit for the Taiko Sound Processor.

bit 1—Enable bit for cross-talk cancellation.

bit 2—Enable bit for reverb.

bit 3—Enable bit for Master Volume.

bits 7:4—Enable bits for LFOs. When the Enable bit for an LFO is not set, the Global Processing Engine will skip processing for that LFO. The LFO will retain all its value.

bits 11:8—Enable bits for Pitch Envelopes. When the Enable bit for a Pitch Envelope is not set, the Global Processing Engine will skip processing for that Pitch Envelope. The Pitch Envelope will retain all its value.

bits 12:15—Enable bits for smoothing. The Enable bit for a smoothing feature is enabled, transitions will be smoothed across a frame of data. Bit 0 enables gain smoothing, bit 1 enablespitch smoothing, bit 2 enables HRTF coefficient smoothing, and bit 3 enables HRTF interaural time smoothing.

bit 16—This bit is sent to the DAC to control de-emphasis.

bits 21:17—Number of 3D voices. Used for limiting the number of 3D voices processed. Used for saving power, or for reducing the number of voices supported when running the Taiko Sound Engine at speeds slower than 24 MHz. Valid values are 0-16.

bits 27:22—Number of 2D voices. Used for limiting the number of 2D voices processed. Used for saving power, or for reducing the number of voices supported when running the sound processor at speeds slower than 24 MHz. Valid values are 0-48.

The fifth power saving feature is disabling the individual voices that are processed by the sound processor using the voice disable register 138. Voices which are disabled save power because the 2-D and 3-D voice engines 110 and 112 will not fetch sound data from main memory, and will not perform any calculations. The voice engines 110 and 112 may remain in an idle waiting state during the time that it normally processes the voice. There are two situations in which the voice engines one 110 and 112 enter this low-power state instead of processing a voice.

The first condition is when a voice has been played, and afterwards decays to a "0" sound value because of the voice envelope. In this case the voice is not longer creating sound, and so the voice will subsequently not process the voice until it receives a command to play another sound. The second condition is when the voice's voice disable bit is "1" in the voice disable register 138, which contains the voice disable bits for all 64 voices.

The program executing on the host processor 104 sets the voice disable bit for a voice when it knows that it currently does not need to use the voice. The voice disable feature is particularly useful, for example, when a game needs to switched from one game mode to another, because disabled voices maintain their state. For example, if a game is being played, and the user pushes the "Pause" button, the currently playing game sounds can be paused by setting the voice disable bits of the currently used voices, thus conserving power. Then the game can use a different set of voices for menu beeps and other sound effects. When the user returns to the game, the game sound can be resumed by resetting the voice disable bits.

According to the method and system disclosed herein, the present invention provides a sound processor with a set of registers to implement power saving features that may be used to reduce the power consumed by the sound processor when particular sound processor operations are not in use. The power saving features include temporarily disabling global effects; temporarily halting voices when entering different playback modes, such as "pause"; placing the entire sound processor in a low-power state via the DAC interface when the user indicates the game system should enter a sleep state; implementing more 2-D voices to conserve power by putting 3-D voices in 2-D mode; and allowing the sound processor to run on a lower operating frequency by limiting the number of 2-D and 3-D voices used.

A method and system for reducing power consumption of a sound processor has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for reducing power consumption of a sound processor, comprising:
   providing a sound processor access to at least one register having a plurality of bits corresponding to sound operations capable of being performed by the sound processor, the sound processor being capable of processing multiple 2-D and 3-D voices;
   allowing a host processor to write a value to at least a portion of the plurality of bits in the at least one register during sound processing to selectively disable individual operations performed by the sound processor; and
   using the at least one register a to enable or disable any combination of sound processor operations including; effects performed on the voices, a DAC interface, 3-D voices in 2-D mode, a number of 3-D and 2-D voices processed, and which voices are to be processed; and
   further including using the said at least one register to disable effects performed on the voices including any combination of; cross-talk cancellation, reverb, master volume, low-frequency oscillators (LFO), and pitch envelopes.

2. The method of claim 1 wherein disabling the DAC interface causes the sound processor to enter a low-power state.

3. The method of claim 1 wherein the sound processor utilizes more power when processing 3D voices than used for processor 2D voices, the method further including: using the at least one register to reduce the number of 3-D voices being processed to save power.

4. The method of claim 3 further including: using the at least one register to limit the number of 2-D and 3-D voices processed even when the sound processor is set to operate at a lower frequency.

5. The method of claim 4 further including: using the at least one register to disable individual voices that are processed by the sound processor.

6. The method of claim 1 further including: providing at least one global enable register and at least one voice disable register.

7. The method of claim 6 further including: providing the global enable register with a first plurality of bits for enabling and disabling the effects performed voices, a second plurality of bits for limiting a number of 3-D voices processed, and a third plurality of bits for limiting a number of 2-D voices processed.

8. The method of claim 7 wherein each bit in the voice disable register corresponds to a respective one of the multiple voices capable of being processed by the sound processor.

9. The method of claim 8 further comprising: implementing the voice disable register as a separate registers.

10. A system for reducing power consumption of a sound processor, comprising:
    register means accessible by the sound processor having a plurality of bits corresponding to sound operations capable of being performed by the sound processor;
    host processor means capable of writing a value to at least a portion of the plurality of bits in the register means during sound processing to selectively disable individual operations performed by the sound processor; and,
    wherein the sound processor is capable of processing multiple 2-D and 3-D voices and, wherein the register means is used to enable or disable any combination of sound processor operations including; effects performed on the voices, a DAC interface, 3-D voices in 2-D mode, a number of 3-D and 2-D voices processed, and which voices are to be processed;
    wherein said register means is used to disable effects performed on the voices including any combination of; cross-talk cancellation, reverb, master volume, low-frequency oscillators (LFO), and Ditch envelopes.

11. The system of claim 10 wherein disabling the DAC interface causes the sound processor to enter a low-power state.

12. The system of claim 10 wherein the sound processor utilizes more power when processing 3D voices than used for processor 2D voices, and wherein the register means is used to reduce the number of 3-D voices being processed to save power.

13. The system of claim 12 wherein the register means is used to limit the number of 2-D and 3-D voices processed even when the sound processor is set to operate at a lower frequency.

14. The system of claim 13 wherein the register means is used to disable individual voices that are processed by the sound processor.

15. The system of claim 10 wherein the register means comprises at least one global enable register and at least one voice disable register.

16. The system of claim 15 wherein the global enable register includes a first plurality of bits for enabling and disabling the effects performed voices, a second plurality of bits for limiting a number of 3-D voices processed, and a third plurality of bits for limiting a number of 2-D voices processed.

17. The system of claim 16 wherein each bit in the voice disable register corresponds to a respective one of the multiple voices capable of being processed by the sound processor.

18. The system of claim 17 wherein the voice disable register is implemented as a separate registers.

* * * * *